US012101707B2

United States Patent
Padlikar et al.

(10) Patent No.: US 12,101,707 B2
(45) Date of Patent: Sep. 24, 2024

(54) OPTIMAL NETWORK FUNCTION DATA PATH DISCOVERY FOR 5G CORE

(71) Applicant: Mavenir Networks, Inc., Richardson, TX (US)

(72) Inventors: Vipin Padlikar, Bangalore (IN); Tamanna Jindal, Plano, TX (US)

(73) Assignee: Mavenir Networks, Inc., Richardson, TX (US)

( * ) Notice: Subject to any disclaimer, the term of this patent is extended or adjusted under 35 U.S.C. 154(b) by 396 days.

(21) Appl. No.: 17/353,944

(22) Filed: Jun. 22, 2021

(65) Prior Publication Data

US 2021/0314842 A1  Oct. 7, 2021

Related U.S. Application Data

(63) Continuation of application No. PCT/US2020/012508, filed on Jan. 7, 2020.

(60) Provisional application No. 62/789,800, filed on Jan. 8, 2019.

(51) Int. Cl.
*H04W 40/02* (2009.01)
*H04W 36/14* (2009.01)
*H04W 40/24* (2009.01)
*H04W 84/04* (2009.01)

(52) U.S. Cl.
CPC .......... *H04W 40/02* (2013.01); *H04W 36/14* (2013.01); *H04W 40/246* (2013.01); *H04W 84/042* (2013.01)

(58) Field of Classification Search
None
See application file for complete search history.

(56) References Cited

U.S. PATENT DOCUMENTS

| 9,749,899 B2 | 8/2017 | Raleigh et al. |
| 2014/0307573 A1 | 10/2014 | Park et al. |
| 2014/0348130 A1 | 11/2014 | Kaippallimalil et al. |
| 2016/0198349 A1 | 7/2016 | Fox et al. |

(Continued)

OTHER PUBLICATIONS

Extended European Search Report for corresponding European application No. 20738011.4, 8 pages, dated Sep. 8, 2022.

(Continued)

*Primary Examiner* — Clemence S Han
(74) *Attorney, Agent, or Firm* — Ruggiero McAllister & McMahon LLC

(57) ABSTRACT

In a method and an apparatus for optimizing network function (NF) data path discovery for 5G Core network operation, each NF registers itself with the NRF and periodically updates the NRF about the NF's present load, thereby giving the NRF complete information regarding the network topology, the NFs' present load, and the relative capacities of the NFs, which information items can be used in determining the complete optimal path from the RAN to the PSA. When an SMF wants to insert an Intermediate UPF (I-UPF) into a data path, instead of querying the NRF for a UPF serving the present geographical area (e.g., of the User Equipment (UE)) and deciding on the UPF insertion locally based on the present geographical area, the SMF queries the NRF for the complete optimal path. The I-UPF load can be taken into consideration in calculating the optimal path between the RAN and the PSA.

8 Claims, 6 Drawing Sheets

(56) References Cited

U.S. PATENT DOCUMENTS

| | | | |
|---|---|---|---|
| 2018/0227743 A1 | 8/2018 | Faccin et al. | |
| 2019/0132784 A1* | 5/2019 | Thubert | H04W 72/044 |
| 2019/0215724 A1* | 7/2019 | Talebi Fard | H04W 48/16 |
| 2019/0306251 A1* | 10/2019 | Talebi Fard | H04W 76/10 |
| 2019/0313468 A1* | 10/2019 | Talebi Fard | H04W 76/12 |
| 2020/0007590 A1* | 1/2020 | Dodd-Noble | H04L 65/1069 |
| 2020/0128450 A1* | 4/2020 | Wang | H04W 60/00 |
| 2020/0344655 A1* | 10/2020 | Rommer | H04W 76/36 |
| 2020/0351985 A1* | 11/2020 | Zhu | H04W 60/005 |
| 2020/0374946 A1* | 11/2020 | Bedekar | H04W 92/04 |
| 2020/0413236 A1* | 12/2020 | Roeland | H04W 4/50 |
| 2021/0044481 A1* | 2/2021 | Xu | H04W 72/02 |
| 2021/0368427 A1* | 11/2021 | Rommer | H04W 48/16 |
| 2022/0346190 A1* | 10/2022 | Zhu | H04W 80/10 |

OTHER PUBLICATIONS

Nokia et al: "23.501 6.3.3: NRF for UPF", 3GPP Draft; S2-176496 S2-175356 Was S2-174315-23501 NRF_For_UPF, 3rd Generation Partnership Project (3GPP), Mobile Competence Centre; 650, Route Des Lucioles; F-06921 Sophia-Antipolis Cedex; France vol. SA WG2, No. Sophia Antipolis, France; Aug. 21, 2017-Aug. 25, 2017 Aug. 29, 2017 (Aug. 29, 2017), XP051335866.

Huawei et al: "TS 23.501: UPF Selection based on SMF Local Information",3GPP Draft; S2-178136 WAS8113 PCR-23501_UPF Selection_R3, 3rd Generation Partnership Project (3GPP), Mobile Competence Centre; 650, Route Des Lucioles; F-06921 Sophia-Antipolis Cedex; France vol. SA WG2, No. Ljubljana, Slovenia;Oct. 23, 2017-Oct. 27, 2017 Oct. 27, 2017 (Oct. 27, 2017), XP051348025.

China Telecom: "UPF selection factor", 3GPP Draft; S2-186504-UPF Selection Factor, 3rd Generation Partnership Project (3GPP), Mobile Competence Centre; 650, Route Des Lucioles; F-06921 Sophia-Antipolis Cedex; Francevol. SA WG2, No. Vilnius, Lithuania; Jul. 2, 2018-Jul. 6, 2018Jun. 25, 2018 (Jun. 25, 2018), XP051537984.

Huawei et al: "TS 23.501 Co-existence of multiple PSAs in SSC mode 3 sessions", 3GPP Draft; S2-174337_TS23.501 Co-Existence of Multiple PSAS in SSC Mode 3 Sessions VI, 3rd Generation Partnership Project (3GPP), Mobile Competence Centre; 650, Route Des Lucioles; F-06921 Sophia—vol. SA WG2, No. San Jose Del Cabo; Jun. 26, 2017-Jun. 30, 2017 Jun. 25, 2017 (Jun. 25, 2017), XP051303190.

International Preliminary Report on Patentability for corresponding international application PCT/2020/012508, 7 pages, dated Jun. 16, 2021.

ETSI. "5G; System Architecture for the 5G System," 3GPP TS 23.501 version 15.3.0 Release 15, [retrieved on Mar. 14, 2020). Retrieved from the Internet: <URL: df> pp. 1-99.

"Road to 5G: Introduction and Migration," GSMA corporate website at www.gsma.com, [retrieved on Mar. 13, 2020]. Retrieved from the Internet: <URL: https://www.gsma.com/futurenetworks/wp-content/uploads/2018/04/Road-to-5G-Introduction-an d-Migration_FINAL.pdf> pp. 1-54.

International Search Report for corresponding international application PCT/2020/012508, 2 pages, dated Apr. 9, 2020.

Written Opinion for corresponding international application PCT/2020/012508, 6 pages, dated Apr. 9, 2020.

\* cited by examiner

OPTIMAL NETWORK FUNCTION DATA PATH DISCOVERY FOR 5G CORE

CROSS REFERENCE TO RELATED APPLICATIONS

The present application is a continuation application of International (PCT) application No. PCT/US2020/012508 filed Jan. 7, 2020 which claims priority to U.S. Provisional Patent Application No. 62/789,800, filed on Jan. 8, 2019, both of which are incorporated herein by reference in their entireties.

BACKGROUND OF THE DISCLOSURE

1. Field of the Disclosure

The present disclosure relates to 5G Core network for mobile communication, and relates more particularly to a method and an apparatus for optimizing network function (NF) data path discovery for, e.g., 5G Core network operation or operation of any other types of mobile networks such as LTE (4G), 3G, Wi-Fi, IoT networks handling user data transmission.

2. Related Art

5G Core (5GC) has defined network function (NF) and architecture that support service-based architecture (SBA). FIG. 1 shows an example embodiment of the service-based architecture, which includes: User Plane Function (UPF) module 101; Network Repository Function (NRF) module 102 (e.g., utilizing associated interface Nnrf); Data Network (DN) 103; User Equipment (UE) 104; Radio Access Network (RAN) 105; Authentication Server Function (AUSF) module 106 (e.g., utilizing associated interface Nausf); Access and Mobility Management Function (AMF) module 107 (e.g., utilizing associated interface Namf); Application Function (AF) module 108 (e.g., utilizing associated interface Na); Network Exposure Function (NEF) module 109 (e.g., utilizing associated interface Nnef); Network Slice Selection Function (NSSF) module 110 (e.g., utilizing associated interface Nnssf); Policy Control Function (PCF) module 111 (e.g., utilizing associated interface Npcf); Session Management Function (SMF) module 112 (e.g., utilizing associated interface Nsmf); and Unified Data Management (UDM) module 113 (e.g., utilizing associated interface Nudm). The above-mentioned NFs (e.g., UPF, NRF, SMF, etc.) can be implemented, e.g., as software programs executed by computer processors. Therefore, as used in the present disclosure, the various NFs are interchangeably referred to as network "functions" and/or network "function modules." Further detailed description of NRF and UPF modules are provided below.

NRF module can be a network entity that supports NF registration, NF discovery and Subscribe/Notification services. In a 5G network, all NFs register themselves with the NRF module. During registration, each respective NF registers the list of micro-services or NF Services that the respective NF can provide to other NFs. The NF that is registering its services is called a Provider NF. When a first NF wants to use the services provided by a second NF, the first NF, which is called a Consumer NF, queries the NRF using selected input parameters, and the NRF returns the best suited Provider NF credentials to the Consumer NF.

User plane services are offered by a UPF (also referred to as Data Plane Function (DPF)), and an SMF performs the session management for the user plane services. An SMF can also perform UPF discovery on a need basis. As an example, an SMF queries an NRF asking for a UPF instance which can serve a UE in the present region. The NRF responds to the SMF with the information regarding the most appropriate UPF, and the SMF inserts the most appropriate UPF in the data path between a RAN and a Packet Data Unit Session Anchor (PSA). Such individual discovery and insertion of a UPF, when repeated sequentially, often leads to a non-optimal data path between the PSA and the UPF facing the RAN, in large part due to the failure to consider i) the increased load on previously present UPFs in the path, and ii) the latency between the subsequently identified UPF and adjacent UPFs.

FIG. 2 shows an example of a comparison of an optimal data path versus a suboptimal data path between the PSA and the UPF facing the RAN. In the example shown in FIG. 2, the UE 104 moves starting from Region 1, to Region 2, and then to Region 3. When the UE 104 first registers in Region 1, the UPF1 is selected as PSA by SMF 112. When the UE 104 moves out of region served by UPF1 (i.e., Region 1) into Region 2, the SMF 112 queries the NRF 102 to identify UPF2 as the node best suited to serve Region 2, and UPF2 is put in the data path, using an N9 tunnel created between UPF2 and UPF1. Next, when the UE 104 moves from Region 2 to Region 3, the SMF 112 queries the NRF 102 to identify UPF3 as the node best suited to serve Region 3, and UPF3 is put in the data path, using an N9 tunnel created between UPF3 and UPF2.

The above-described path-selection technique by the SMF 112 fails to identify an optimal path, i.e., a direct path from UPF4 to UPF1, since the SMF 112 does not have an overview of available optimal path. This problem is exacerbated when the UE 104 moves progressively further away from Region 1 (shown as R #1) to Region N (shown as R #n), as shown in FIG. 3. In addition, the above-described incremental additions of the UPF fails to consider any load increase occurring for a particular UPF after the particular UPF has been selected for the path.

SUMMARY OF THE DISCLOSURE

A method and an apparatus for optimizing network function (NF) data path discovery for 5G Core network operation are provided. By utilizing an NRF, an SMF is able to obtain an overview of available optimal path.

In an exemplary embodiment according to the present disclosure, each NF (e.g., UPF) when provisioned in the network, registers itself with NRF over the Service based interface using the service APIs exposed by the NRF, and then periodically updates the NRF about the NF's present load over the same SBI interface with the NRF. In this manner, the NRF obtains complete information regarding the network topology, the NFs' present load, and the relative capacities of the NFs. The NRF uses these information items to assist in the determination of the complete optimal path from the RAN to the PSA.

In another embodiment according to the present disclosure, when an SMF wants to insert an Intermediate UPF (I-UPF) into a data path, instead of querying the NRF for an instance of UPF serving the present geographical area (e.g., of the UE) and then deciding on the UPF insertion locally based on the present geographical area, the SMF queries the NRF for the complete optimal path between the RAN and the PSA.

In another embodiment, the NRF can employ a dynamic programming methodology, e.g., Dijkstra's shortest path algorithm or Floyd-Warshall shortest path algorithm, to derive the optimal shortest path between the RAN and the PSA.

In another embodiment, the I-UPF load is taken into consideration in calculating the optimal shortest path between the RAN and the PSA.

DETAILED DESCRIPTION OF THE EMBODIMENTS

Figure 2:
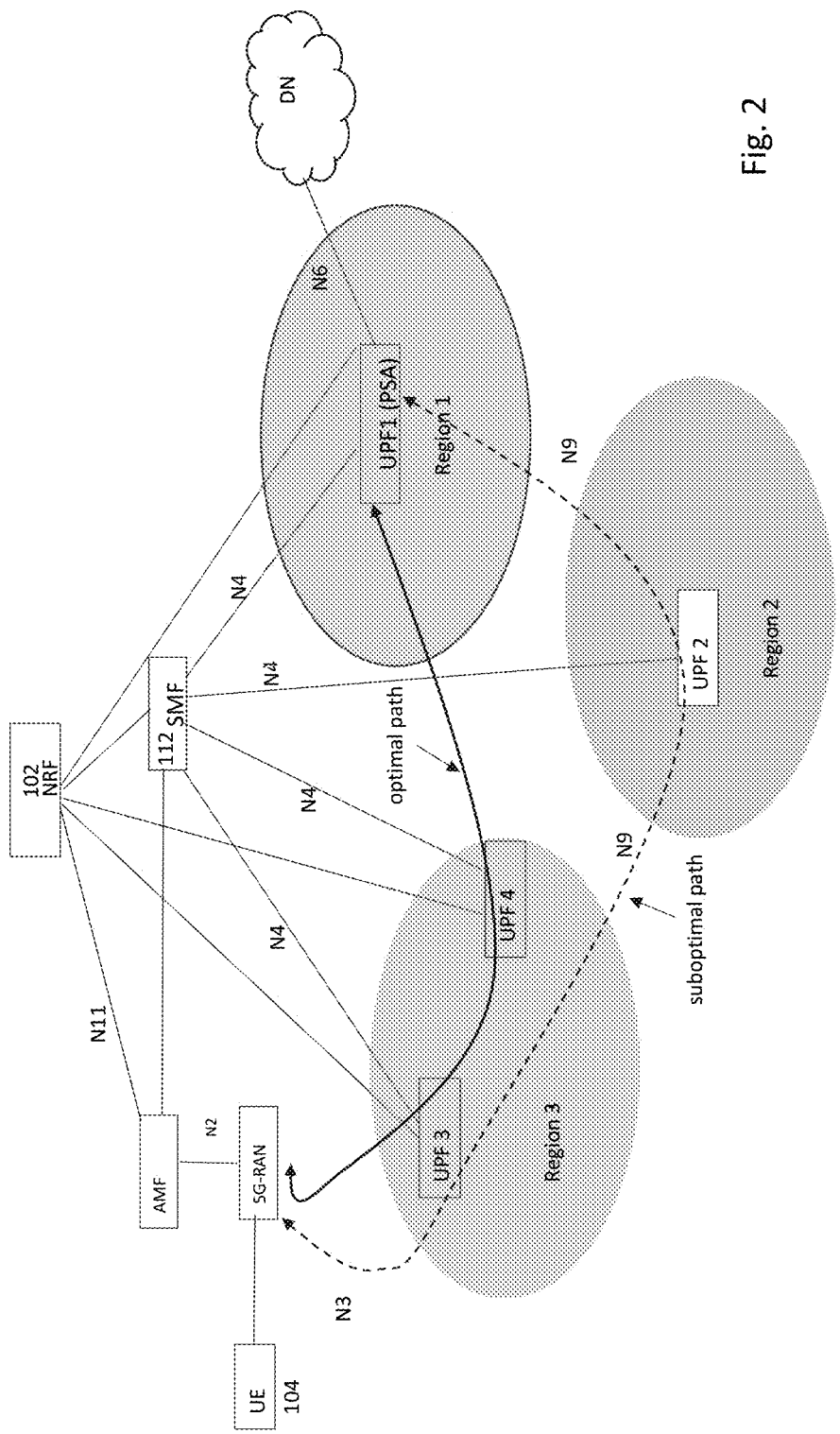
FIG. 2 shows an example of a comparison of an optimal data path versus a suboptimal data path between the PSA and the UPF facing the RAN.
Figure 3:
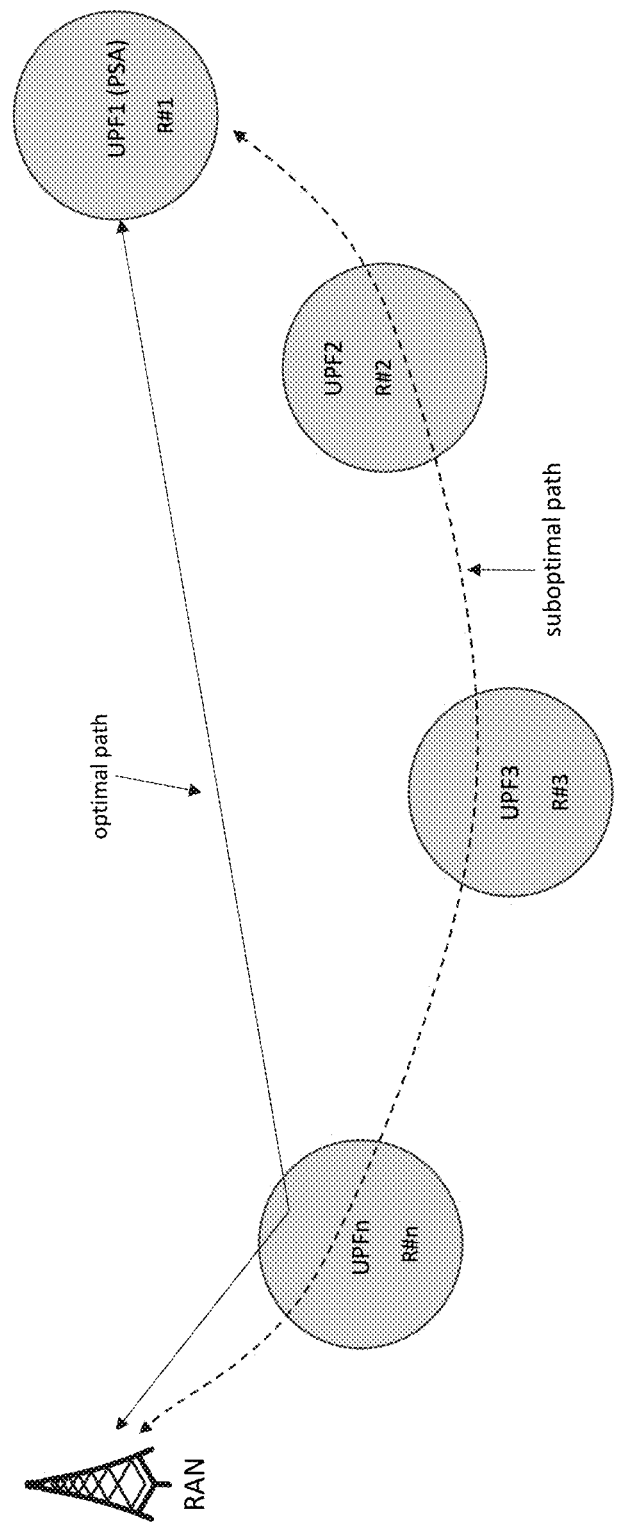
FIG. 3 shows another example of a comparison of an optimal data path versus a suboptimal data path between the PSA and the UPF facing the RAN.

In an example embodiment, all the NFs (e.g., UPFs) i) register themselves with the NRF during NF bring-up using the service-based interface between the respective NF and the NRF, and ii) periodically update the NRF about the NFs' present load by using the service-based interface between the respective NF and the NRF. In this manner, the NRF obtains complete information regarding the network topology, complete information regarding the present NFs' load, and complete information regarding the relative capacities of the NFs. Such information at the NRF can be used to determine the complete optimal path from the RAN to the PSA. In the example shown in FIG. 2, the optimal path would be UPF4 to UPF1, and in the example shown in FIG. 3, the optimal path would be UPFn to UPF1.

In an example embodiment according to the present disclosure, when an SMF wants to insert an Intermediate UPF (I-UPF) into a data path, instead of querying the NRF for an instance of UPF serving the present geographical area (e.g., of the UE) and then deciding on the UPF insertion locally based on the present geographical area, the SMF queries the NRF for the complete optimal path between the RAN and the PSA.

Figure 4:
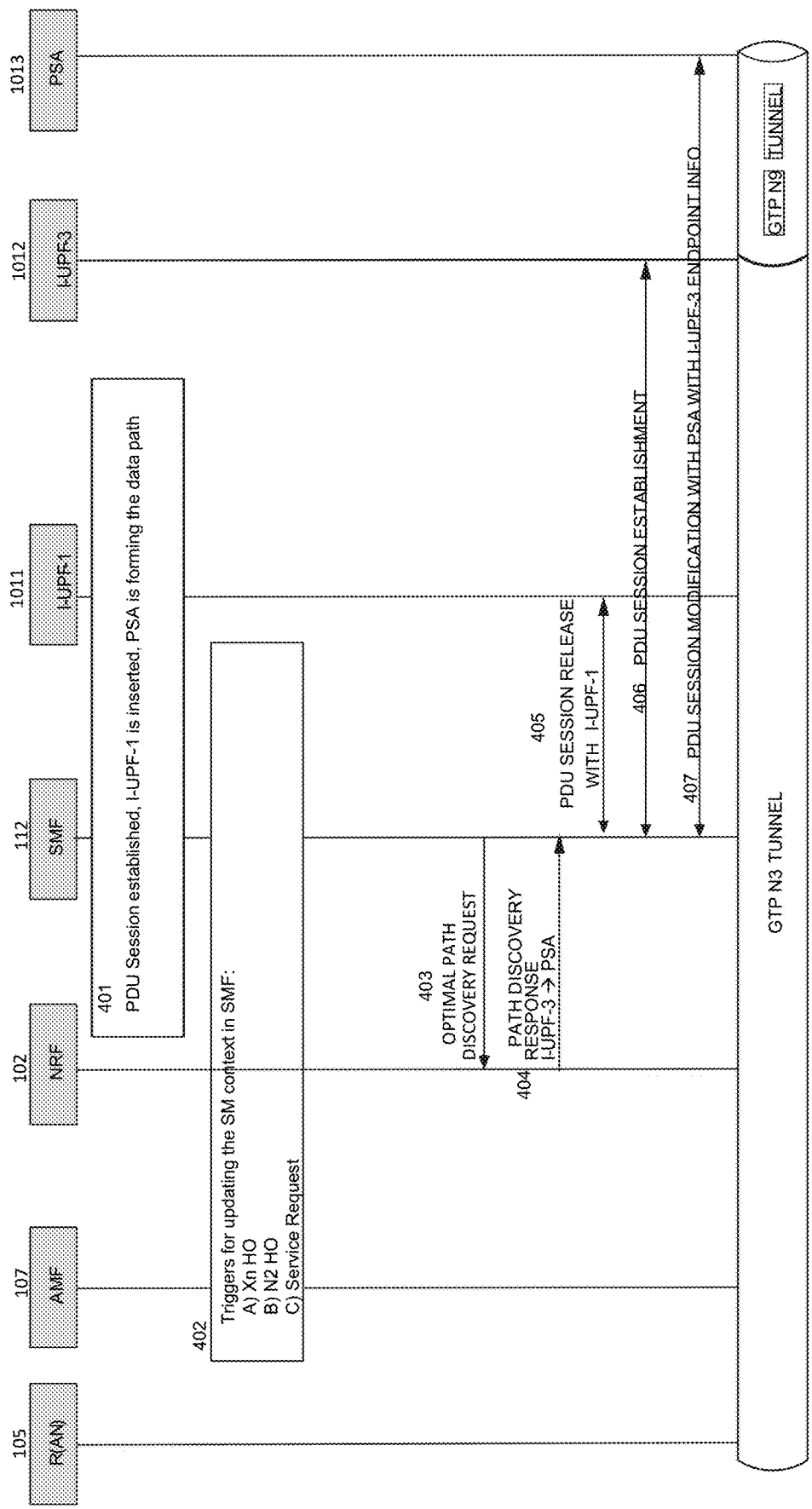
FIG. 4 shows an example call flow for determining an optimal path between the RAN and the PSA of the present disclosure.

FIG. 4 shows an example call flow for determining an optimal path between the RAN and the PSA as the UE moves from one region to another. At 401, PDU session is established, I-UPF-1 1011 (e.g., corresponding to UPF2 shown in FIG. 2) is inserted into the data path by the SMF 112, and PSA 1013 forms the initial data path when the UE is in the initial region. At 402, the presence of one or more triggers for updating the Session Management (SM) context in SMF 112 is checked. The triggers can include, e.g., the following: A) Xn hand-over (Xn HO); B) N2 hand-over (N2 HO); and C) service request. Xn HO procedure can be used to hand over a UE from a source NG-RAN to a target NG-RAN when the UE is moving out of the coverage area of the source NG-RAN, and a signaling connection exists between the source NG-RAN and the target NG-RAN. N2 HO procedure can be used when the UE is moving out of the coverage area of the source NG-RAN and no signaling connection exists between the source NG-RAN and the target NG-RAN, in which case the source NG-RAN initiates a hand-over to the target NG-RAN by signaling to the SMF 112, via the AMF 107, that the UE is moving out of the coverage area of the source NG-RAN. Service Request procedure can be triggered by the UE when it is in Connection Management Idle (CM-IDLE) state (a state in which the UE does not have an active connection with the network) and wants to send uplink signaling messages or user data, or is responding to a paging message from the network.

When at least one of these procedures is triggered, the Session Management (SM) context in the SMF 112 sends, at 403, a request for discovery of optimal data path to the NRF 102. At 404, the NRF 102 responds to the SMF 112, based on the information available to the NRF 102 and the current region of the UE, what the optimal data path between the RAN and the PSA 1013 is, e.g., a new I-UPF-3 1012 (e.g., corresponding to UPF 4 shown in FIG. 2). At 405, the SMF 112 performs a PDU session release with the I-UPF-1 1011. At 406, the SMF 112 establishes a PDU session with the new I-UPF-3 1012. At 407, the SMF 112 modifies the PDU session with the PSA 1013 by updating the new I-UPF-3 1012 endpoint information.

Figure 1:
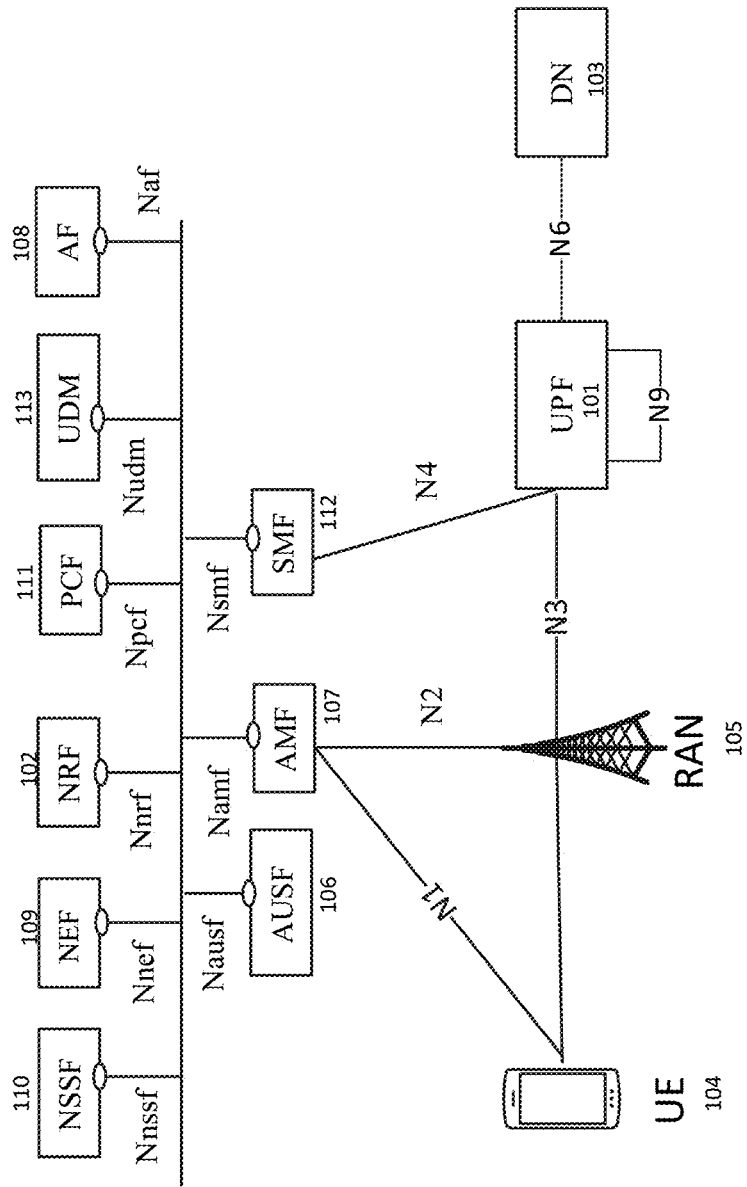
FIG. 1 shows an example of the known service-based architecture.
Figure 5:
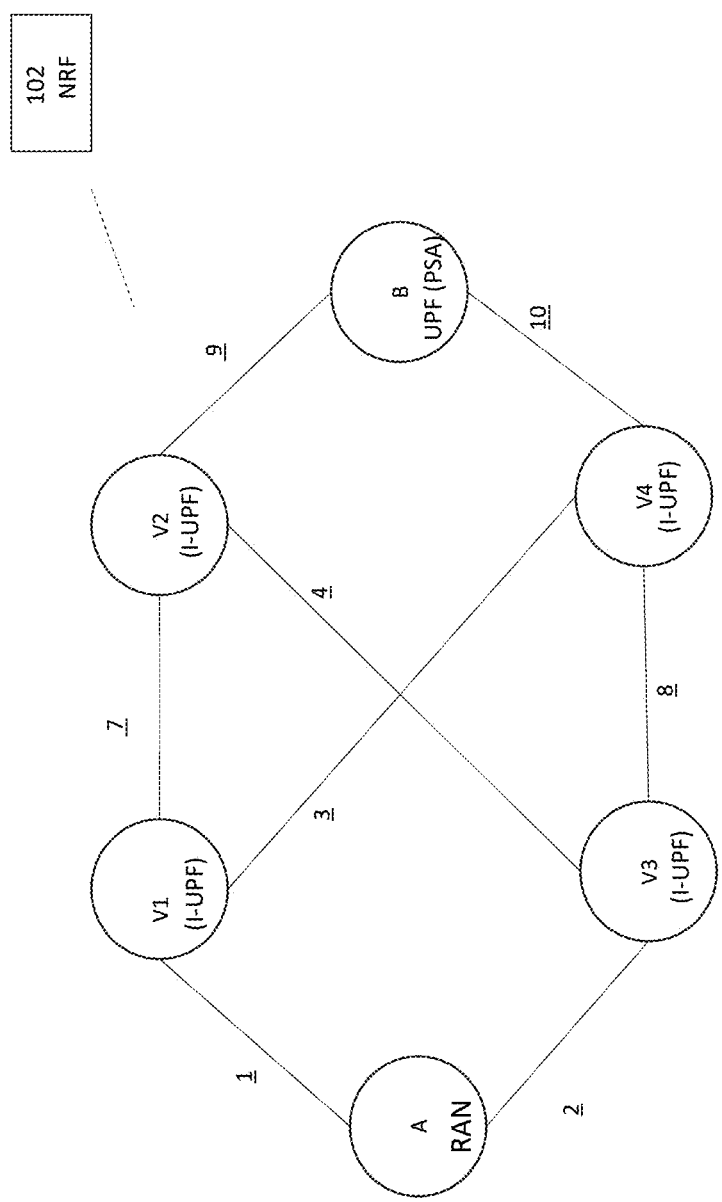
FIG. 5 illustrates an example of a complete network topology as a connected graph.

FIG. 5 illustrates an example of a complete network topology as a connected graph, with Nodes V1-V4, edges represented by connecting lines, and respective edge costs shown by underlined numerical values 1, 2, 3, 4, 7, 8, 9 and 10. Node A represents a RAN, Node B represents UPF (PSA), and the Nodes V1 through V4 represent I-UPFs. In one example embodiment, the NRF 102 stores, views and/or analyzes the complete network topology as a connected graph (e.g., including the locations of the UPFs and the edge costs of respective connections each linking a pair of network elements, e.g., I-UPFs, RAN and PSA, within the network) shown in FIG. 5, and the NRF 102 assists the SMF (e.g., SMF 112 shown in FIGS. 1, 2 and 4) in the optimal overall path selection, instead of just providing the single NF level detail. In one example embodiment, the NRF 102 can employ a dynamic programming methodology, e.g., Dijkstra's shortest path algorithm or Floyd-Warshall shortest path algorithm, to derive the optimal shortest path between the RAN and the PSA, which shortest path for the example topology represented in FIG. 5 is A→V1→V4→B. Other methodologies can be utilized, and the present disclosure is not intended to be limited to the Dijkstra's shortest path algorithm or Floyd-Warshall shortest path algorithm.

Figure 6:
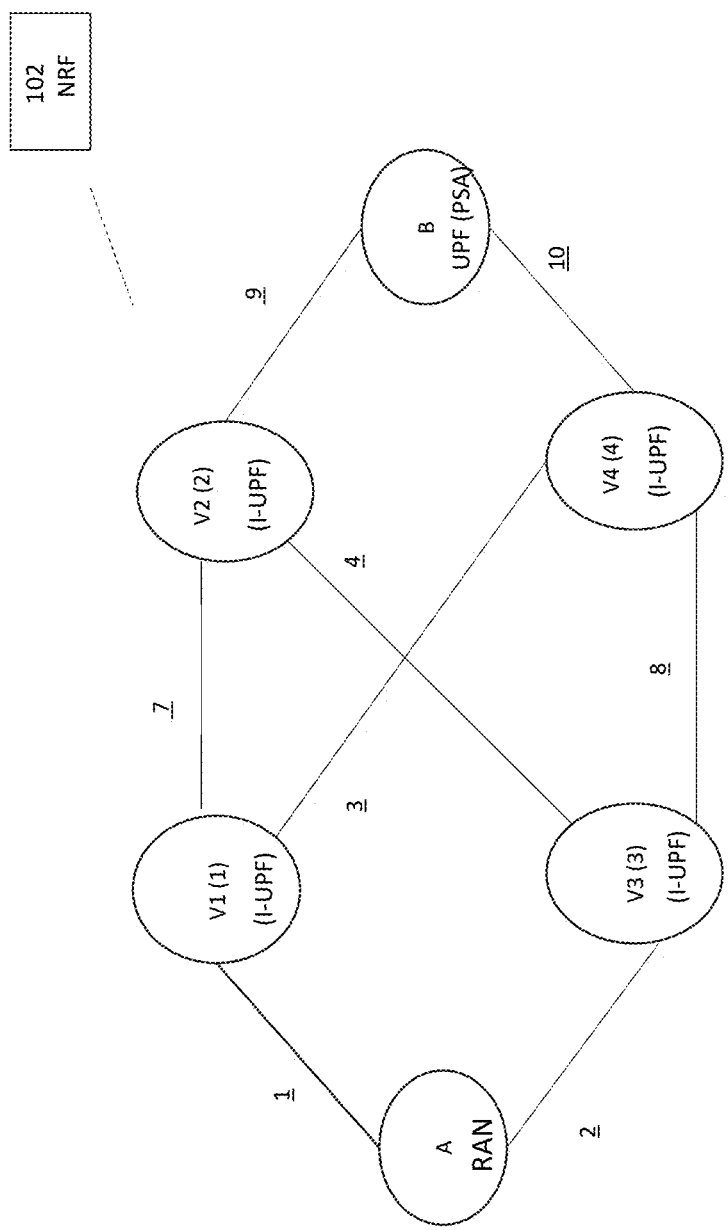
FIG. 6 illustrates another example of a complete network topology as a connected graph.

FIG. 6 illustrates a connected graph corresponding to the connected graph shown in FIG. 5, with the addition of UPF load indication represented by bracketed numerical values (1) through (4) for the corresponding I-UPF nodes V1 through V4. In this manner, an example embodiment according to the present disclosure can take into consideration the I-UPF load in calculating the optimal shortest path between the RAN and the PSA. In the example embodiment, every NF (e.g., UPF) periodically updates its respective load to the NRF, and the NRF adds the load information regarding the nodes to the edge costs to calculate the optimal path between the RAN and the PSA.

The optimal path selection by the above-described method results in a fewer number of UPFs in the data path, which in turn leads to lesser GTP overhead due to fewer N9 tunnels in the data path.

One example method of optimizing user plane function (UPF) module selection for a data path in 5G Core network operation serving a user equipment (UE) includes: registering, by each of a plurality of UPF modules, the each respective UPF module with a network repository function (NRF) module; updating, by each of the plurality of UPF modules, the NRF module with information regarding the each respective UPF module's present load; sending, by a session management function (SMF) module, a request to the NRF module for discovery of optimal data path between a radio access network (RAN) and a packet data unit session anchor (PSA), for serving a present region of the UE; and determining, by the NRF module, the optimal data path between the RAN and the PSA, for serving the present region of the UE. In this example method, the optimal data path can be determined based on an overall network topology of the 5G Core network, the overall network topology including at least the locations of the plurality of UPF modules. The overall network topology can further include edge costs of respective connections each linking a pair of network elements, and the network elements can include at least the plurality of UPF modules, the RAN and the PSA. In addition, the overall network topology can further include a load of at least one intermediate UPF (I-UPF).

In an example method, the sending of the request to the NRF module for discovery of optimal data path can be triggered when at least one of the following occurs: i) Xn hand-over (Xn HO), in which a UE is handed over from a source NG-RAN to a target NG-RAN and a signaling connection exists between the source NG-RAN and the target NG-RAN; ii) N2 hand-over (N2 HO), in which a UE is handed over from a source NG-RAN to a target NG-RAN using signaling to the SMF and no signaling connection exists between the source NG-RAN and the target NG-RAN; and iii) a service request.

One example system for optimizing user plane function (UPF) module selection among a plurality of UPF modules for a data path in 5G Core network operation serving a user equipment (UE) includes: a network repository function (NRF) module configured to register each of the plurality of UPF modules, wherein each of the plurality of UPF modules updates the NRF module with information regarding each respective UPF module's present load; and a session management function (SMF) module configured to send a request to the NRF module for discovery of optimal data path between a radio access network (RAN) and a packet data unit session anchor (PSA), for serving a present region of the UE; wherein the NRF module is configured to determine the optimal data path between the RAN and the PSA, for serving the present region of the UE. In this example system, the NRF module can be configured to determine the optimal data path based on an overall network topology of the 5G Core network, the overall network topology including at least the locations of the plurality of UPF modules. The overall network topology can further include edge costs of respective connections each linking a pair of network elements, and the network elements can include at least the plurality of UPF modules, the RAN and the PSA. In addition, the overall network topology can further include a load of at least one intermediate UPF (I-UPF).

In one example system, the sending of the request to the NRF module for discovery of optimal data path can be triggered when at least one of the following occurs: i) Xn hand-over (Xn HO), in which a UE is handed over from a source NG-RAN to a target NG-RAN and a signaling connection exists between the source NG-RAN and the target NG-RAN; ii) N2 hand-over (N2 HO), in which a UE is handed over from a source NG-RAN to a target NG-RAN using signaling to the SMF and no signaling connection exists between the source NG-RAN and the target NG-RAN; and iii) a service request.

The techniques and embodiments described herein are exemplary, and should not be construed as implying any specific limitation on the present disclosure. It should be understood that various alternatives, combinations and modifications could be devised by those skilled in the art. For example, steps associated with the processes described herein can be performed in any order, unless otherwise specified or dictated by the steps themselves. The above description is illustrative, and is not intended to be restrictive. One of ordinary skill in the art may make numerous modifications and/or changes without departing from the general scope of the disclosure.

Although the present disclosure utilizes 5G Core network operation as an example, the present disclosure is intended to encompass, and is fully applicable to, operations of other types of mobile networks, e.g., LTE (4G), 3G, Wi-Fi, IoT, etc. In addition, and as has been described, the above-described embodiments (and/or aspects thereof) can be used in combination with each other. Additionally, portions of the above-described embodiments can be removed without departing from the scope of the disclosure. In addition, modifications can be made to adapt a particular situation or material to the teachings of the various embodiments without departing from their scope. Many other embodiments will also be apparent to those of skill in the art upon reviewing the above description. The present disclosure is intended to embrace all such alternatives, modifications and variances that fall within the scope of the appended claims.

Some embodiments may be described using the expression "one embodiment" or "an embodiment" along with their derivatives. These terms mean that a particular feature, structure, or characteristic described in connection with the embodiment is included in at least one embodiment. The appearances of the phrase "an embodiment" in various places in the specification are not necessarily all referring to the same embodiment.

Glossary of Terms

5GC $5^{th}$ Generation Core Network
5GS $5^{th}$ Generation System
AF Application Function
AMF Access and Mobility Management Function
AUSF Authentication Server Function
BP Branching Point
DN Data Network
DPF Data Plane Function
DPI Deep Packet Inspection
ICMP Internet Control Message Protocol
I-UPF Intermediate User Plane Function
loT Internet of things
LMF Location Management Function
LTE Long Term Evolution
MTU Maximum Traffic Unit
NEF Network Exposure Function
NF Network Function
NG-RAN Next Generation Radio Access Network
NMAP Network Mapper
Nnrf Service-based interface exhibited by NRF
NRF Network Repository Function
NSSF Network Slice Selection Function
PCF Policy Control Function
PDU Packet Data Unit
PSA Packet Data Unit (PDU) Session Anchor
RAN Radio Access Network
SMF Session Management Function
UDM Unified Data Management UE User Equipment
UL Uplink
ULCL Uplink Classifier
UPF User Plane Function

What is claimed is:

1. A method of optimizing user plane function (UPF) module selection for a data path in 5G Core network operation serving a user equipment (UE), comprising:
   registering, by each of a plurality of UPF modules, the each respective UPF module with a network repository function (NRF) module;
   updating, by each of the plurality of UPF modules, the NRF module with information regarding the each respective UPF module's present load;
   sending, by a session management function (SMF) module, a request to the NRF module for discovery of an updated, complete optimal data path between a radio access network (RAN) and a packet data unit session anchor (PSA) for serving the UE, wherein the updated, complete optimal data path includes an updated intermediate UPF (I-UPF) module replacing a previous I-UPF module, and wherein the sending of the request to the NRF module for discovery of optimal data path is triggered when at least one of the following occurs: i) Xn hand-over (Xn HO), in which a UE is handed over from a source NG-RAN to a target NG-RAN and a signaling connection exists between the source NG-RAN and the target NG-RAN; ii) N2 hand-over (N2 HO), in which a UE is handed over from a source NG-RAN to a target NG-RAN using signaling to the SMF and no signaling connection exists between the source NG-RAN and the target NG-RAN; and iii) a service request; and
   determining, by the NRF module, the updated, complete optimal data path between the RAN and the PSA via the updated I-UPF module for serving the UE, wherein the updated, complete optimal data path is determined based on an overall network topology of the 5G Core network irrespective of proximity of a UPF module serving a present geographical area of the UE, the overall network topology comprising at least the locations of the plurality of UPF modules including the updated I-UPF module.

2. The method of claim 1, wherein the overall network topology for determining the updated, complete optimal data path further comprises edge costs of respective connections each linking a pair of network elements, and wherein the network elements comprise at least the plurality of UPF modules including the at least one I-UPF module, the RAN and the PSA.

3. The method of claim 2, wherein the overall network topology for determining the updated, complete optimal data path further comprises a load of the at least one intermediate UPF (I-UPF) module.

4. The method of claim 1, wherein the overall network topology for determining the updated, complete optimal data path further comprises at least a load of the at least one intermediate UPF (I-UPF) module.

5. A system for optimizing user plane function (UPF) module selection among a plurality of UPF modules for a data path in 5G Core network operation serving a user equipment (UE), the system comprising:
   a network repository function (NRF) module configured to register each of the plurality of UPF modules, wherein each of the plurality of UPF modules updates the NRF module with information regarding each respective UPF module's present load; and
   a session management function (SMF) module configured to send a request to the NRF module for discovery of an updated, complete optimal data path between a radio access network (RAN) and a packet data unit session anchor (PSA) for serving the UE, wherein the updated, complete optimal data path includes an updated intermediate UPF (I-UPF) module replacing a previous I-UPF module, and wherein the sending of the request to the NRF module for discovery of optimal data path is triggered when at least one of the following occurs: i) Xn hand-over (Xn HO), in which a UE is handed over from a source NG-RAN to a target NG-RAN and a signaling connection exists between the source NG-RAN and the target NG-RAN; ii) N2 hand-over (N2 HO), in which a UE is handed over from a source NG-RAN to a target NG-RAN using signaling to the SMF and no signaling connection exists between the source NG-RAN and the target NG-RAN; and iii) a service request;
   wherein the NRF module is configured to determine the updated, complete optimal data path between the RAN and the PSA via the updated I-UPF module for serving the UE, and wherein the NRF module is configured to determine the updated, complete optimal data path based on an overall network topology of the 5G Core network irrespective of proximity of a UPF module serving a present geographical area of the UE, the overall network topology comprising at least the locations of the plurality of UPF modules including the at least one I-UPF module.

6. The system of claim 5, wherein the overall network topology for determining the updated, complete optimal data path further comprises edge costs of respective connections each linking a pair of network elements, and wherein the network elements comprise at least the plurality of UPF modules including the at least one I-UPF module, the RAN and the PSA.

7. The system of claim 6, wherein the overall network topology for determining the updated, complete optimal data path further comprises a load of the at least one intermediate UPF (I-UPF) module.

8. The system of claim 5, wherein the overall network topology for determining the updated, complete optimal data path further comprises at least a load of the at least one intermediate UPF (I-UPF) module.

* * * * *